United States Patent [19]

Turney et al.

[11] Patent Number: 5,411,574
[45] Date of Patent: May 2, 1995

[54] TITANIUM EXTRACTION

[75] Inventors: Terence W. Turney, Mount Waverley; Manh Hoang, South Clayton, both of Australia

[73] Assignee: Commonwealth Scientific and Ind. Research Org., Campbell, Australia

[21] Appl. No.: 190,205
[22] PCT Filed: Aug. 19, 1992
[86] PCT No.: PCT/AU92/00435
  § 371 Date: Mar. 16, 1994
  § 102(e) Date: Mar. 16, 1994
[87] PCT Pub. No.: WO93/04206
  PCT Pub. Date: Mar. 4, 1993

[30] Foreign Application Priority Data

Aug. 19, 1991 [AU] Australia ............................ PK7799
Apr. 2, 1992 [AU] Australia ............................ PL1653

[51] Int. Cl.[6] ........................ C22B 3/14; C22B 34/12
[52] U.S. Cl. ........................ 75/743; 423/69; 423/81
[58] Field of Search .................. 75/743; 423/69, 81

[56] References Cited

U.S. PATENT DOCUMENTS

| | | | |
|---|---|---|---|
| 2,165,315 | 7/1939 | Svendsen | 423/69 |
| 2,316,141 | 4/1943 | Wainer | 423/69 |
| 2,670,271 | 2/1954 | Thomsen | 23/119 |
| 2,698,220 | 12/1954 | Erskine | 23/61 |
| 2,837,406 | 6/1958 | Schaufelberger | 23/147 |
| 2,847,300 | 8/1958 | Paull | 75/103 |
| 3,252,920 | 5/1966 | Goren | 260/2.1 |
| 3,811,871 | 5/1974 | Taylor | 75/84 |
| 5,085,837 | 2/1992 | Chao | 423/69 |

OTHER PUBLICATIONS

Hewedi, M. A. et al., Proc. Internat. Symp. on Hydrometallurgy, Chicago, Ill. A25/2-1/3, 1973 pp. 806-858.
International Search Report, PCT/AU92/00435.

*Primary Examiner*—Peter D. Rosenberg
*Attorney, Agent, or Firm*—Merchant, Gould, Smith, Edell, Welter & Schmidt

[57] ABSTRACT

A process for producing a titanium product, which process includes: providing a titanium-containing material; and a leaching composition including: a source of ammonia or ammonium ions; a source of carbon dioxide or carbonate ions; and water; and contacting the titanium-containing material with the leaching composition to form an aqueous slurry for a time sufficient such to form a soluble titanium leach product; and isolating a leaching solution containing the titanium leach product so formed.

19 Claims, 1 Drawing Sheet

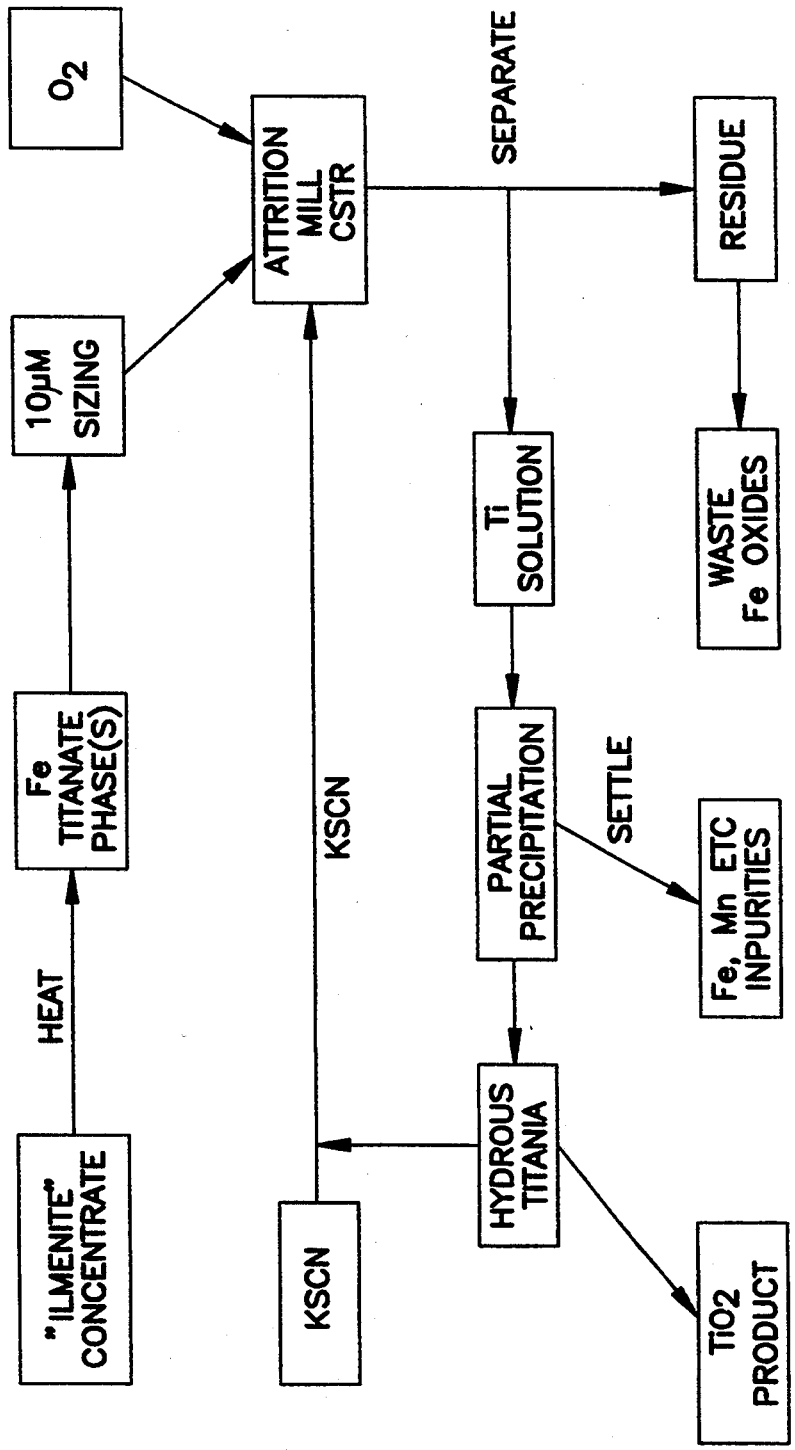

TITANIUM EXTRACTION

The present invention relates to a process for producing a titanium product from titanium containing materials, including the iron titanate material, ilmenite.

Titanium is a metal widely used for structural applications, particularly in corrosive environments. A principal use in its oxide form is as a paint filler.

Titanium principally occurs in nature as the mineral ilmenite, $FeTiO_3$, with lesser amounts found as perovskite, $CaTiO_3$, sphene, $CaTiSiO_5$, and geikelite, $MgTiO_3$. Rutile, anatase and brookite, all forms of $TiO_2$, pseudorutile, leucoxene, pseudobrookite and other iron titanium oxide phases as well as synthetic titanium-containing slags are also important raw materials.

It is well known that there are many iron titanium oxide phases and solid solutions and that these can be produced and interconverted in a very complex and poorly understood series of reactions, which are dependent on the overall elemental composition of the system, the reaction atmosphere, the $O_2$ fugacity of the system, the temperature, time and the presence of minor components and catalysts (see for example, Lindsley, D. H., in "Oxide Minerals", Reviews in Mineralogy, Vol. 3, Mineral. Soc. Amer., Washington, U.S.A., 1976, ppL-1 to L-84). Thus, it has been found that at elevated temperatures reactions such as the following can occur:

$FeO + FeTiO_3 \rightarrow Fe_2TiO_5$ (pseudobrookite)
$2FeO + TiO_2 \rightarrow Fe_2TiO_4$ (ulvospinel)
$FeO + 2TiO_2 \rightarrow FeTi_2O_5$ (ferropseudobrookite) and
$TiO_2 \rightarrow 2FeTiO_3 \rightarrow Fe_2Ti_3O_9$ (pseudorutile)

Such phases can have variable composition, being able to form solid solutions with a range of iron and other oxides. Many of the iron titanate phases can be poorly crystalline and can have variable amounts of the elements of water contained in their structures.

Industrial processes known in the prior art for the extraction of titanium, as synthetic rutile, for example from ilmenite, include i) The Sulphate Route: A mixture of ilmenite and scrap iron or a Ti-rich slag is treated with hot sulphuric acid to afford a mixture of $FeSO_4$ (copperas) and Fe-containing $TiO(SO_4)_2$. Cooling results in crystallisation of the copperas whilst the Fe-containing $TiO(SO_4)_2$ is removed and hydrolysed to afford impure titania (or "synrutile"). Further upgrading is required to produce pigment-grade titania. This prior art process suffers from the problems of requiring large amounts of liquid acid and producing 3-4 tonnes of solid copperas per tonne of titania produced.

ii) The Chloride Process: A mixture of carbon and ilmenite is chlorinated at high temperatures, to afford volatile $TiCl_4$ together with some $FeCl_3$. After purification, the $TiCl_4$ is oxidised to $TiO_2$. This process requires the use of both high temperatures and large quantities of highly corrosive and toxic $Cl_2$ gas. Significant amounts of $FeCl_3$ waste is also produced in some variants of this process.

Thus, complex and expensive processing plant is required to withstand conditions and the number of necessary steps. Moreover, considerable waste material needs to be disposed of.

Further, it has been known in the prior art that leaching, using compounds in the $NH_3$—$CO_2$—$H_2O$ system, can be employed to extract non-ferrous metals from their ores (Hewedi, M. A. and Engle, L. F., Proc. Internat. Symp. on Hydrometallurgy, Chicago, Ill., United States of America, 25/2-1/3/1973, pp 806-858). However, none of the ores treated have been highly or even moderately refractory nor have the elements to which the disclosure relates been difficult to isolate by competing routes. Thus such extractions have been limited to the amine or mixed amine/carbonate complexes of Cu, Ni, Co, Mn, Zn, Ga, In, U and Be.

Accordingly, it is an object of the present invention to overcome, or at least alleviate, one or more of the difficulties or deficiencies related to the prior art.

Accordingly, in a first aspect, there is provided a process for producing a titanium product, which process includes providing
a titanium-containing material; and
a leaching composition including
a source of ammonia or ammonium ions;
a source of carbon dioxide or carbonate ions; and
water; and
contacting the titanimum-containing material with the leaching composition to form an aqueous slurry for a time sufficient to form a titanium leach product; and
isolating a leaching solution containing the titanium leach product so formed.

The titanium leach product may take the form of a titanium-containing complex.

The titanium-containing material may be a titanium-containing mineral or mineral ore. The titanium-containing material may be a titanium compound or complex.

The titanium-containing material may be selected from one or a combination of ilmenite, perovskite, sphene, geikelite, pseudorutile or leucoxene, pseudobrookite and other iron titanate phasis or synthetic titanium-containing slags, for example as produced by reduction of these materials. Other titanium-containing materials include titanates, silicotitanates or aluminotitanates derived from one or more of the alkaline earths (Mg, Ca, Ba, Sr), iron, rare earths, manganese, copper or aluminium. The titanium-containing materials may contain varying amounts of impurities, such as Hf, Th, U, other actinides, Y, Pb, W, Mo, Nb, Ta or Zr, either in solid solution or as a discrete amorphous or crystalline phase.

The particle size of the titanium-containing material may be selected to improve the efficiency of the process according to the present invention. Relatively small particles of titanium-containing materials such as ilmenite, generally below approximately 100 microns in average diameter and preferably below approximately 50 microns have been found to be suitable.

Accordingly, in a preferred aspect of the present invention, the process further includes
subjecting the titanium-containing material to a size reduction step prior to, or simultaneously with, the leaching step to form particles of average diameter below approximately 100 microns, preferably below approximately 50 microns.

The size reduction step may include a crushing and/or grinding step. The size reduction step may include a milling process. Attrition milling is preferred.

The size reduction step may be conducted prior to, or simultaneously with, the leaching step. The size reduction may be preferably achieved in situ by performing the milling process and leaching simultaneously.

The source of ammonium ions may be selected from ammonium compounds such as ammonium carbonate, ammonium bicarbonate, ammonium carbamate, or mixtures thereof. The source of ammonia may be aqueous or free ammonia.

The source of carbonate ions may similarly be selected from ammonium compounds such as ammonium carbonate, ammonium bicarbonate or ammonium carbamate, or mixtures thereof. The source of carbon dioxide may be free carbon dioxide or carbonic acid.

A suitable leaching solution includes an aqueous ammonium bicarbonate solution wherein the ammonium bicarbonate is added to water in the ratio of approximately 1–200 grams per liter, preferably in the ratio of 40–120 grams per liter and most preferably in the ratio of 70–100 grams per liter; an aqueous ammonium carbamate solution wherein the ammonium carbamate is added to water in the ratio of approximately 1–200 grams per liter, preferably in the ratio of 40–120 grams per liter and most preferably in the ratio of 70–100 grams per liter; or a mixture of ammonium bicarbonate and ammonium carbamate in a weight ratio of approximately 10:1 to 1:10, preferably approximately 5:1. The leaching slurry may contain undissolved ammonium bicarbonate and/or ammonium carbamate. The presence of an excess of undissolved material is not necessarily detrimental to the leaching process.

The source of ammonium ions and/or the source of carbonate ions may be provided as pure solids or as mixtures, or may be generated in situ. For example, reactions may be generated with appropriate proportions of ammonia and carbon dioxide with water.

The source of ammonium ions and the source of carbonate ions may be present in any suitable relative amounts. The ratio of contained $NH_3$ to $CO_2$ may be in the range of approximately 100:1 to 1:100, preferably approximately 5:1 to 1:5 by weight.

The source of ammonium ions and the source of carbonate ions may be present in the aqueous slurry in any suitable amounts. The components of the leaching composition may be present in the aqueous slurry such that the concentration thereof is sufficiently high to ensure rapid reaction with the titanium-containing material and/or to provide at least sufficient stability of the dissolved titanium complex. The ratio of the leaching solution to the titanium-containing material may be such that the molecular ratio of $CO_2$ to Ti is at least approximately 1:1.

Accordingly, ilmenite and other binary (or multernary) oxides of titanium react with aqueous solutions of a leaching agent derived from ammonium carbonate or related compounds. Preferably, the weight ratio of total carbon dioxide and carbonate, expressed as an equivalent weight of carbon dioxide, contained in the leaching slurry, may be in the range of approximately 1–200 grams, more preferably in the range 10–50 grams and most preferably in the range 20–40 grams per gram of titanium contained in the material to be leached.

The leaching step of the process according to the present invention may be conducted at any suitable temperature. Temperatures in the range of 0° C. to approximately 200° C. may be used. The temperature during the leaching step of the process should be preferably high enough to ensure rapid reaction with the titanium-containing material, but low enough to ensure that decomposition of the dissolved titanium complex is minimised. Temperatures in the range of approximately 5° to 50° C., preferably approximately 20° to 25° C., have been found to be suitable.

The process may be conducted in any suitable conventional manner, including utilising batch processing in opened or closed vessels including autoclaves or continuous processing. The process according to the present invention may be conducted under pressures ranging from approximately atmospheric to approximately 100 MPa above atmospheric. The process is preferably conducted at elevated pressure of approximately 10 to 50 MPa in the presence of air or oxygen.

The process according to the present invention may continue for a time sufficient for the titanium-containing complex to be formed. The process may continue for approximately 2 to 48 hours, preferably approximately 5 to 24 hours.

In a further aspect, the leaching step may be conducted in the presence of carbon dioxide ($CO_2$). It has been found that the presence of $CO_2$ may increase the overall yield of titanium product. Whilst we do not wish to be restricted by theory, it is postulated that the $CO_2$ functions to block the premature formation of $TiO_2$.

The $CO_2$ may be provided in any suitable form. $CO_2$ gas or solid $CO_2$ (dry ice) may be used. Alternatively, precursor compounds which generate $CO_2$ gas in situ may be used.

Preferably the $CO_2$ is introduced into an autoclave preferably a stirred autoclave during the leaching step.

The leaching composition utilised in the process according to the present invention may preferably include secondary components. Secondary components which initiate and/or accelerate and/or alter the thermal stability or solubility of the titanium-leach product in the aqueous solution and/or preferentially separate any titanium phase formed from impurity phase or phases, may be used.

Secondary components which may be included in the leaching solution may be selected from the free acids, salts or esters or phosphoric, phosphorous, sulphuric, sulphurous, citric, oxalic, benzoic, acetic or higher carboxylic, alkyl- or arylphosphonic or -sulphonic acids or the free acids or salts of the halides $F^-$, $Cl^-$, $Br^-$, $I^-$ or pseudohalides $CN^-$, $OCN^-$, $SCN^-$ or combinations thereof. Alkali metal or alkaline earth metal salts of the halides or pseudohalides are preferred. An alkali metal thiocyanate, e.g. KSCN is preferred. The secondary components may be added as pure solids or liquids, as diluted solutions or generated in situ, such as by reaction of free acids with $NH_3$ or the major leachant components. The secondary components may be present in the leaching composition in amounts of 0 to approximately 95% by weight, preferably approximately 0.1% to 10% by weight.

The leaching solution containing titanium-leach product may be separated from the aqueous slurry in any suitable manner. The titanium-leach product may be separated from any unreacted material or from insoluble reaction products, by filtration, flotation, centrifugation or by sedimentation.

The residue may be recycled and reacted further with fresh leaching composition with the same or a different composition under the same or different reaction conditions as used in the original leaching reaction.

Accordingly, in a preferred aspect of the present invention the process may further include
 separating the titanium leach product from the leaching solution, and recycling the leach residue of the separation step to the leaching step.

It has been found that recycling the residue may significantly increase the yield of the titanium product.

It will be understood that the starting materials, for example natural "Ilmenite" ore actually includes various phases—$FeTiO_3$ (Ilmenite), pseudorutile, leucoxene, pseudobrookite and other iron titanate phases, rutile, anatase, brookite and the like. Accordingly, the process of the present invention may be presented in a simplified form as $FeTiO_3 + NH_4HCO_3 \rightarrow TiO_2 + FeCO_3 + FeO$ etc.

The iron oxide and like phases are not susceptible to reaction with ammonium bicarbonate.

Thus in both the natural ilmenite ore and in the residue produced, there are a number of components which are not susceptible to reaction with ammonium carbonate. The titanium-containing material may include an unreactive iron-containing phase and/or unreactive titanium-containing phase.

Similarly it will be understood that other iron titanium phases or solid solutions may be used as starting materials which may be more or less suitable or reactive with ammonium bicarbonate than ilmenite.

Accordingly in a preferred aspect of the present invention, the process may further include the preliminary step of subjecting the titanium-containing material to a heating step before or after size reduction.

Various forms of titanium oxide, or other titanium-containing phases can be added either to the starting material or the leach residues and subjected to particular heat treatments in various atmospheres, thereby converting the contained titanium into a form suitable for further leaching by the current process.

The starting material may be heated to a temperature of approximately 100° C. to 1350° C., preferably approximately 200° C. to 600° C.

This pretreatment may be optionally performed in air or oxygen.

Alternatively or in addition, in a still further aspect of the present invention the process may further include subjecting the residue to a heating step.

The residue may be heated to a temperature of approximately 100° C. to 1350° C., preferably approximately 300° C. to 800° C.

Where necessary, iron oxide may be added to facilitate the above reactions. Iron oxide may be supplied in any suitable form from sources such as iron carbonate, various iron ores, iron hydroxides, iron oxyhydroxides, scrap iron, jarosite as well as the residue cycled from the separation step in the present process.

As stated, in a further aspect of the present invention, there is provided a soluble titanium-containing complex having the composition:

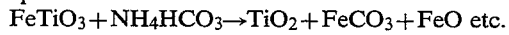

where, x = a number from 0 to 4
y + 2z + 2w + u = 4 + x
S = mono-, di-, or trivalent anion
a = a number from 0 to 10
x, y, z, w, u, a need not be integers.

For example the soluble Ti complex may have the formula $(NH_4)_3[Ti(OH)(CO_3)_3]$.

In a preferred aspect of the present invention, the process of producing a titanium product may further include subjecting the titanium leach product to a decomposition step.

A titanium-containing product, for example rutile, anatase, brookite or hydrous titania or other titanium-containing solids may be isolated from the leaching solution by any suitable means, such as by thermal decomposition in solution or of titanium species isolated from the solution, or by removal of the unreacted leachant components.

The titanium-containing product may be precipitated out by seeding the solution with titanium crystals.

Alternatively, the titanium-containing product may be utilised in solution form, for example to form coatings on a substrate.

The titanium-containing product may be subjected to further reactions, e.g. either in solution form or after extraction to form mixed metal oxides as described in Australian Patent Appln. PL2626 to applicants the entire disclosure of which is incorporated herein by reference.

Conditions of decomposition may be selected to control the phase, morphology, size and purity of the titanium-containing product.

Decomposition of the titanium-containing species may result in formation of free gaseous $NH_3$, $CO_2$ or other components of the original leaching solution; these may be returned to the reaction process. After removal of some or all of the soluble titanium-containing species, the leaching solution may be recycled for use with a fresh charge of ilmenite or other titanium-containing material.

The invention will now be more fully described with reference to the accompanying examples. It should be understood, however, that the following description is illustrative only and should not be taken in any way as a restriction on the generality of the invention described above.

EXAMPLE 1

Natural ilmenite (10 g, WIM-150, full spectrum, <10μ particle size) was attrition milled with zirconia balls (TZP, 1 mm diameter, 950 g), water (200 g), $NH_4HCO_3$ (80 g), in an open vessel, at room temperature for 16 hours. The resultant dark brown slurry was centrifuged and the supernatant liquid filtered to remove any remaining solids. The filtrate was gently heated on a hot plate to afford a white precipitate of hydrous titania which was subsequently calcined at 300° C. to give $TiO_2$ (1 g, 18% extraction). Further heating to 700° C. yielded well crystalline rutile, with an XRD powder pattern identical to that given in by the JCPDS Powder Pattern Diffraction File #21-1276.

EXAMPLE 2

A sample, consisting of a mixture of synthetic ilmenite (80 mol %) and rutile (20 mol %) (10 g) was stirred in an attrition mill with water (200 ml) and PSZ beads (200 g, 1 mm diameter) to reduce particle size. Commercial "ammonium bicarbonate" (80 g) (a mixture of $NH_4HCO_3$ and $NH_4CO_2HN_2$ in approximate ratio of 5:1) was added and the attrition milling continued for a further 6 hours at an approximate pH of 8.5. After that period the slurry was filtered and the residue analysed to reveal unchanged rutile and some unreacted ilmenite. The filtration was evaporated to dryness at 120° C. and heated to 700° C. for 30 min. The XRD of the white residue, which weighed 1.17 g, showed it to contain crystalline rutile by comparison with the JCPDS Powder Pattern File (#21-1276).

EXAMPLE 3

The residue from Example 2 was taken and extracted with a fresh batch of ammonium bicarbonate solution as in Example 1. The yield is as shown in the Table.

EXAMPLE 4

The residue from Example 3 was taken and extracted with a fresh batch of ammonium bicarbonate solution as in Example 1. The yield is as shown in the Table.

EXAMPLE 5

The residue from Example 4 was taken and extracted with a fresh batch of ammonium bicarbonate solution as in Example 1. The yield is as shown in the Table.

EXAMPLE 6

The residue from Example 5 was heated in air to 800° C. for 4 h to convert any unreacted ilmenite or free $TiO_2$ or other Ti-containing phases into a reactive Fe titanate phase, such as pseudobrookite (detected by XRD). The sample was taken and extracted with a fresh batch of ammonium bicarbonate solution as in Example 1. The yield is as shown in the Table.

EXAMPLE 7

The residue from Example 6 was again heated to 800° C. and extracted with a fresh batch of ammonium bicarbonate solution as in Example 1. The yield is as shown in the Table.

| Example | $TiO_2$ Recovered (g) | % $FeTiO_3$ Extracted | % Total $TiO_2$ Extracted |
| --- | --- | --- | --- |
| 2 | 1.17 | 25 | 20 |
| 3 | 1.17 | 25 | 20 |
| 4 | 0.54 | 11 | 9 |
| 5 | 0.36 | 8 | 6 |
| | | Total $TiO_2$ Extracted | 55 |
| THERMAL TREATMENT | | | |
| 6 | 1.1 | — | 18 |
| 7 | 0.8 | — | 13 |
| | | Total $TiO_2$ Extracted | 86 |

EXAMPLE 8

The procedure from Example 1 was followed, except that attrition milling was carried out for only 6 hours. The resultant yield of $TiO_2$ was only 0.4 g (7%0, demonstrating that milling is required for a minimum period of time.

EXAMPLE 9

The procedure of Example 1 was followed except that conc. ammonia solution (140 ml) was added with the ammonium bicarbonate, to give an initial pH of about 10.6. The yield of $TiO_2$ recovered decreased to 0.6 g, showing the deleterious effect on extraction by increasing the pH.

EXAMPLE 10

Natural ilmenite (10 g, WIM-150, full spectrum, <10μ particle size) was attrition milled with 1 mm TZP balls (950 g) and water (200 g) in an open vessel, at room temperature for 24 hours. At the end of that period, $NH_4HCO_3$ (80 g) was added to the mixture and milling continued for a further 6 hours. The slurry was centrifuged and the supernatant filtered to remove any remaining solids. The filtrate obtained was heated to 80° C. and a white precipitate was formed. The precipitate was then calcined at 300° C. to give $TiO_2$ (1 g, 18% extraction. This example demonstrates that attrition milling prior to extraction can improve $TiO_2$ yields.

The residue from the above extraction was attrition milled with fresh $NH_4HCO_3$ solution for a further 6 hours, giving additional $TiO_2$ (0.7 g) and an overall yield of 30%.

EXAMPLE 11

Natural ilmenite (10 g, WIM-150, full spectrum, <10μ particle size) was attrition milled with TZP balls (1 mm dia. 900 g), water (200 g), $NH_4HCO_3$ (80 g) and KSCN (0.1 g) in closed vessel. The dark brown slurry formed was centrifuged and the supernatant filtered to remove any remaining solids. The filtrate obtained was heated on a hot plate to 67° C. to produce a white precipitate. The precipitate was calcined at 300° C. to give a $TiO_2$ yield of 1.7 g (29%). This example shows that the addition of a small amount of a secondary additive can improve $TiO_2$ yields.

EXAMPLE 12

A mixture of ilmenite concentrate (containing approximately 20% free $TiO_2$) and $FeCO_3$, were heated together (900° C., 4 h) in a total Fe/Ti ratio of 2/1 to form a material containing $Fe_2TiO_5$. A sample of this material 10 g) was attrition milled in a reaction system open to the air with PSZ balls (1 mm diameter, 900 g) with an aqueous solution of commercial "ammonium carbonate" (80 g) and potassium thiocyanate (1 g) in 200 ml of water at 20° C. for 20 hours. After that period the slurry was filtered and the filtrate heated to 80° C. to afford a white precipitate. The solid was collected and calcined at 300° C. (4 h) to give $TiO_2$ (1.5 g, 46% extraction). The slurry residue was reheated to 900° C. (4 h) and the extraction repeated giving further $TiO_2$ (0.85 g). The overall extraction efficiency of $TiO_2$ was 74%.

This example shows the improvements which may be obtained by use of a secondary anion, such as SCN, in addition to carbonate.

EXAMPLE 13

The procedure of Example 11 was followed except that the TZP milling media was omitted during the extraction step. An overall $TiO_2$ yield of 0.3 g (5%) shows the importance of milling the material.

EXAMPLE 14

Natural ilmenite (45 g, WIM-150, full spectrum, <10μ particle size) was heated at 350° C. for 4 hours in a stream of pure $O_2$. A sample (5 g) was then attrition milled with TZP balls (1 mm diameter, 450 g), water (100 g), $NH_4HCO_3$ (40 g), KSCN (0.25 g) in a 300 cm³ plastic lined autoclave under air pressure (320 psi), at room temperature for 16 hours. The slurry was centrifuged and the supernatant filtered to remove any remaining solids. The filtrate obtained was heated to 80° C. to afford a white precipitate. After drying at 300° C., 1.25 g $TiO_2$ was obtained (yield 45%).

The residue from the above experiment was separated, and the extraction was repeated, giving further 1.1 g $TiO_2$, with an overall extraction yield of 85%.

EXAMPLE 15

The procedure of Example 14 was followed except that the sample was initially heated to 600° C., before extraction. A combined $TiO_2$ yield of 1.75 g (62%) was obtained after two extractions. This example shows the importance of appropriate thermal pre-treatment before extraction.

EXAMPLE 16

Natural ilmenite (5 g, WIM-150, full spectrum, <10μ particle size) was attrition milled with TZP balls (1 mm diameter, 350 g), water (100 g), $NH_4HCO_3$ (40 g), KSCN (0.25 g) in a 300 $cm^3$ plastic lined autoclave under air pressure air (300 psi), at room temperature for 16 hours. The slurry was centrifuged and the supernatant filtered to remove any remaining solids. The filtrate obtained was heated to 80° C. to afford a white precipitate. After drying at 800° C., 1.1 g $TiO_2$ was obtained, giving a Ti extraction yield of 40%. The residue from the above experiment was heated to 800° C. in air for 3 hours and the extraction was repeated giving further 1.2 g $TiO_2$. The overall Ti extraction yield was 82%.

Finally, it is to be understood that various other modifications and/or alterations may be made without departing from the spirit of the present invention as outlined herein.

We claim:

1. A process for producing a titanium product, which process includes:
   providing
      a titanium-containing material, said titanium-containing material being selected from the group consisting essentially of ilmenite, perovskite, spene, geikelite, pseudorutile, leucoxene, pseudobrookite, other iron titanate phases, titanium-containing slags, silicotitanates, aluminotitanates derived from at least one of the alkaline earths, iron, rare earths, manganese, copper, aluminum, and mixtures thereof; and
      a leaching composition including
         a source of ammonia or ammonium ions;
         a source of carbon dioxide or carbonate ions; and
         water; and
   contacting the titanium-containing material with the leaching composition to form an aqueous slurry for a time sufficient to form a soluble titanium leach product; and
   isolating a leaching solution containing the titanium leach product so formed.

2. A process according to claim 1, wherein the titanium-containing material is selected from ilmenite, perovskite, sphene, geikelite, pseudorutile or leucoxene, pseudobrookite and other iron titanate phases or synthetic titanium-containing slags.

3. A process according to claim 1, further including subjecting the titanium-containing material to a size reduction step prior to, or simultaneously with, the leaching step to form particles of average diameter below approximately 100 microns.

4. A process according to claim 3 wherein the titanium-containing material is subjected to a milling process simultaneously with the leaching step.

5. A process according to claim 3, further including the preliminary step of subjecting the titanium-containing material to a heating step before or after size reduction.

6. A process according to claim 5, wherein the titanium-containing material is heated to a temperature of approximately 200° C. to 600° C.

7. A process according to claim 1, wherein the source of ammonium ions is selected from ammonium carbonate, ammonium bicarbonate, ammonium carbamate or mixtures thereof; and
   the source of carbonate ions is selected from ammonium carbonate, ammonium bicarbonate, ammonium carbamate or mixtures thereof.

8. A process according to claim 7, wherein the ratio of the leaching solution to the titanium-containing material is such that the atomic ratio of $CO_2$ to Ti is at least approximately 1.

9. A process according to claim 1, wherein the leaching step is conducted at temperatures of approximately 5° C. to 50° C., and continues for approximately 2 to 48 hours.

10. A process according to claim 8, wherein the leaching step is conducted at a pressure of approximately 10 to 50 mPa in the presence of air or oxygen.

11. A process according to claim 9, wherein the leaching step is conducted in the presence of carbon dioxide ($CO_2$).

12. A process according to claim 1, wherein the leaching composition further includes secondary components which alter the thermal stability or solubility of the titanium-leach product complex in the aqueous solution and/or preferentially separate any titanium phase formed from impurity phase or phases.

13. A process according to claim 12, wherein the secondary components are selected from the free acids, salts or esters or phosphoric, phosphorous, sulphuric, sulphurous, citric, oxalic, benzoic, acetic or higher carboxylic, alkyl- or arylphosphonic or -sulphonic acids or the free acids or salts of halides ($F^-$, $Cl^-$, $Br^-$, $I^-$) or pseudohalides ($CN^-$, $OCN^-$, $SCN^-$) or combinations thereof.

14. A process according to claim 1, further including separating the titanium leach product from the leaching solution, and
   recycling the leach residue of the separation step to the leaching step.

15. A process according to claim 14, further including subjecting the residue to a heating step to form a reactive iron (Fe) titanate phase.

16. A process according to claim 15, wherein the residue is heated to a temperature of approximately 300° C. to 800° C.

17. A process according to claim 1, further including subjecting the titanium leach product to a decomposition step.

18. A soluble titanium-containing complex having the composition:

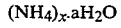

where, x=a number from 0 to 4
y+2z+2w+u=4+x
S=mono-, di-, or trivalent anion
a=a number from 0 to 10
x, y, z, w, u, a need not be integers.

19. A soluble titanium-containing complex according to claim 17 having the formula

* * * * *

UNITED STATES PATENT AND TRADEMARK OFFICE
CERTIFICATE OF CORRECTION

PATENT NO.  : 5,411,574
DATED       : May 2, 1995
INVENTOR(S) : Turney, et al

It is certified that error appears in the above-indentified patent and that said Letters Patent is hereby corrected as shown below:

Column 2, after line 9, insert
                    THE DRAWING
The figure is a flow chart of the inventive process—.

Column 2, lines 10, 11 & 12, delete; "Accordingly, it is an object of the present invention to overcome, or at least alleviate, one or more of the difficulties or deficiencies related to prior art."

Signed and Sealed this

Nineteenth Day of December, 1995

Attest:

BRUCE LEHMAN

*Attesting Officer*     Commissioner of Patents and Trademarks